Jan. 11, 1949.   J. ROGOFF   2,459,004
PREINSULATED AERIAL CABLE TAP CONNECTOR
Filed July 8, 1946

INVENTOR
Julian Rogoff
BY Harry Ernest Rubens
ATTORNEY
46-232

Patented Jan. 11, 1949

2,459,004

UNITED STATES PATENT OFFICE 2,459,004

PREINSULATED AERIAL CABLE TAP CONNECTOR

Julian Rogoff, New Rochelle, N. Y., assignor to Burndy Engineering Company, Inc., a corporation of New York Application July 8, 1946, Serial No. 681,867

9 Claims. (Cl. 174—71)

1

This invention relates to electrical connectors suitable for taking taps from insulated aerial cables.

The practice of installing insulated aerial cable, as contrasted with the more usual practice of supporting uninsulated or weatherproof cable or wire on insulators held by racks or cross-arms, is becoming increasingly widespread. The insulated aerial cable has the advantages of better appearance, easier installation among trees (involving less tree trimming), elimination of cross-arms and insulators, and of requiring lower poles. The factor of better appearance is particularly important, especially in high grade residential districts where the unsightly appearance of ordinary overhead distribution lines has led to the demand for expensive underground distribution. Insulated aerial cable distribution is less expensive than underground distribution and is usually acceptable from an appearance viewpoint.

One of the principal problems of installing aerial cable is that of taking taps from the cable, particularly after the line has been energized. Usually aerial cable is operated at voltages between 2300 volts and 15,000 volts. To strip the insulation from cable operating at such voltages, and then to make the joint and re-insulate is not only hazardous, but requires highly skilled labor. Any voids which may be a result of improper taping (particularly likely to occur at the crotch of the taped joint) are subject to ionization of the entrapped air, with consequent rapid breakdown of the insulation. When it is considered that the lineman usually employed on overhead distribution lines are accustomed to working on bare cables only, it is apparent that taking taps from aerial cables is a major problem that must be solved in a simple manner before the aerial cable is widely used.

One object therefore of my invention is to provide a connector which can be installed at the time the aerial cable is installed, wherein provision is made for a tap conductor.

Another object of my invention is to provide a connector which will provide means for joining a tap conductor to a "hot-line" aerial cable.

A further object of my invention is to provide a connector with the crotch portion insulated by means of a molded glove with an extending tubular section, so that the insulation of the tap connection is a relatively simple straight taping job.

2

I accomplish these and other objects and obtain my new results as will be apparent from the device described in the following specification, particularly pointed out in the claims, and illustrated in the accompanying drawing in which:

Figure 1:
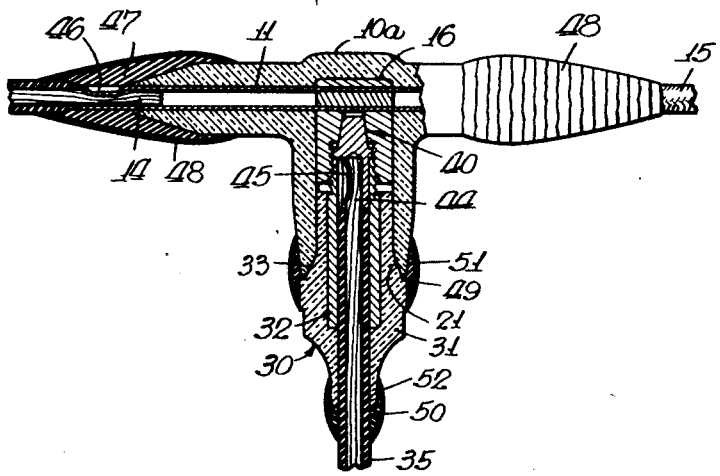
Fig. 1 is a longitudinal cross-sectional view of my connector with complete connections.

The main aerial connector 10 comprises the run member 11, consisting of a tubular section of metal having openings 12 and 13 for inserting the main conductors 14 and 15. The tap member comprises a body section 16 having a bore 17 for force-fitting the tubular section 11 therein, which tubular section may be otherwise secured thereto by brazing or by some other suitable method. The plug 11a may be centrally positioned within the run member to prevent buckling during the force-fitting operation.

Extending transversely of the bore 17, a cone-shaped socket 18 is provided in the body section 16, which is positioned at the bottom of a threaded aperture 19.

The entire cable connector 10 is enclosed in molded insulation 10a which leaves exposed the ends of the tubular section 11, but which extends transversely beyond the body section 16 to form a tube 20, having an entrance seat 21. A tap plug 22 is inserted within the open end of tubular wall 20, which plug is provided with a matching shoulder 23. The plug may be provided with a tubular recess 24 and a shoulder 24a, so that it may fit over the end of the run member 11, as will be hereinafter described. The plug may be secured to the mouth of the tubular wall by heat sealing, at 25, which seals the plug to the molded insulation 10a.

In order to make the tap connection, a special connection 30 is provided. It consists of as insulation plug 31 having a metal extending sleeve 32 mounted and secured therein. The plug is tapered as at 33, and open at 34 to allow the tap conductor 35 (see Fig. 1) to be inserted therethrough, and has a hexagonal turning edge 36 to facilitate turning. The insulation of the plug extends to the threaded end 37 of sleeve 32.

The conductor 35, after insertion through connector 30, is secured to a connector 40 which has a hollow sleeve 41, a shoulder 42 which rests on the threaded end of sleeve 32, and a tapered end 43 which is designed to seat itself in the cone-shaped socket 18. The bared end 44 of the conductor 35 is inserted into the sleeve 41 and indented as at 45, as shown in Fig. 1. The connection 30 is then inserted into the open end of the insulation tube 20 after removal of plug 22, until the threads 37 of sleeve 32, engage the threaded aperture 19, whereupon the connection 30 is rotated until a tight electrical and mechanical connection is made, as shown in Fig. 1.

When the T-shaped connector is installed, the conductors 14 and 15 are bared and inserted inside the sleeve openings 12 and 13, and indented to the sleeve as at 46. Rubber tape 47 is then applied to the exposed metal parts and a covering of friction tape 48 is then taped thereover.

The extending ends of the run member 11 may be covered with the insulation 10a, which is adapted to be rolled back to expose the ends of the run member, thus reducing the amount of insulation required to cover the connections.

Should a tap connection be desired, the seal 25 is cut with a knife to permit the plug 22 to be removed, and connection 30 to be inserted as described above.

It will be noted that the connection 30 is rotated to establish the connection, but the connector 40 is not rotated thereby, but is longitudinally forced into electrical contact.

Figure 2:
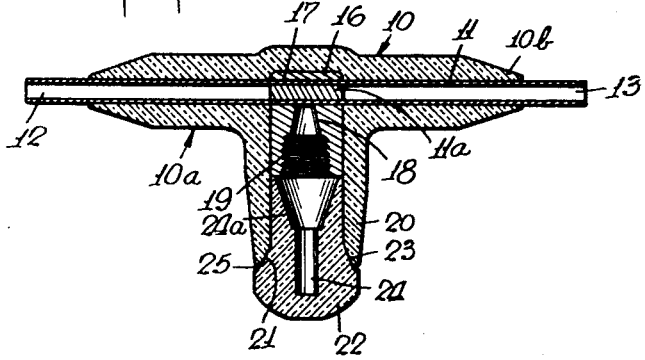
Fig. 2 is a longitudinal cross-sectional view prior to installing the connections.
Figure 3:
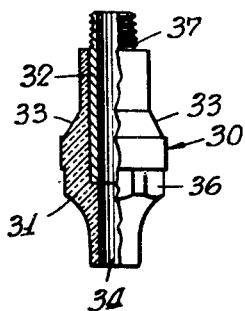
Fig. 3 is a similar view, partly in section, of the tap connection.
Figure 4:
Fig. 4 is a similar view of the tap connector.

The insulating plug 22 may also be used as an insulating cap for the run member in the event the tap connection is installed at the end of an aerial cable run, with the run sleeve 11 fitting into recess 24, and shoulder 24a fitting tightly over taper 10b of the insulation body 10a, indicated in Fig. 2.

When the final tap connection is established, rubber tape 49 and 50 is applied to the joints, and finished with friction tape 51 and 52, respectively.

It will be readily apparent that the usual requirement of "crotch taping" is eliminated by use of my device, thereby lessening the skilled labor needed, as compared with the ordinary taped joint. This is particularly true of cables for use at higher voltages. In such instances, very careful and highly skilled taping would be necessary in order to prevent the formation of voids which could result in the formation of ozone, with consequent breakdown of the taped joint. Furthermore, in the tap connection, tape is applied only to rubber insulated parts.

It is also clear that in my device, a tap connection can be made quickly, even though the run cable is energized. No live metal parts need be handled by the linesmen. The tap member, when inserted, is covered by the insulation sleeve 20 which provides ample overlap on the insulation of the tap connector. The overlap is sufficient to provide insulation with ample creepage for the voltages involved.

The run member is installed at the time the aerial cable line is erected, and may be placed wherever a tap is desired immediately or in the future. The tap member need not be purchased until the need arises for tapping the line, which minimizes the initial cost of installation.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What is claimed is:

1. A connector for tapping into an energized electrical circuit which comprises a body portion having means for electrical connection to the electrical circuit, said body portion having a threaded section, and covered with insulation extending sufficiently beyond the threaded section to provide ample creepage distance therefrom; a tap connection for said body portion comprising an insulating cover provided with an extending sleeve section, having an exposed threaded portion for engagement with the threaded section of said body portion; and a connector, having means for securing the tap conductor thereto prior to establishing contact with the body portion and having a contacting surface for engaging the body portion and provided with an engaging portion rotatably mounted with respect to said tap connection and positioned between the tap connection and the body portion whereby the tap connection may be rotated into threaded engagement with the body portion, driving the connector linearly into firm contact with the body portion.

2. The connector of claim 1, wherein the contacting surface is cone-shaped.

3. The connector of claim 1, wherein the means for securing the tap connector thereto comprises an extending sleeve.

4. The connector of claim 1, with a shoulder for resting on the threaded end of the sleeve section of the tap connector.

5. The tap connection of claim 1, wherein the insulating cover of the tap connection is non-rotatably mounted to the enclosed sleeve section.

6. The connector of claim 1, wherein the insulating cover of the tap connection extends sufficiently beyond the unthreaded end of the enclosed sleeve section to provide ample creepage distance therefrom.

7. In a connector for tapping into an energized electrical circuit having a longitudinally extending central conducting portion covered with insulation having a recess transversely positioned in the insulation with respect to the central conducting portion, an insulated connection section having a central opening for allowing a tap conductor to be inserted therein, and a pressure applying surface forming a part thereof, said connector provided with means for threadedly securing the connector to the insulated connection section; a connector made of a single piece of metal for electrically connecting the central conducting portion with a tap conductor, said connector having an electrical contacting surface for engaging the central conducting portion, a hollow portion for receiving the tap conductor, and a shouldered portion for enabling the pressure applying surface of the insulated connection section to drive the connector into firm contact with the central conducting portion.

8. A connector for tapping into an energized electrical circuit which comprises a metal sleeve having a metal body section secured thereto, and extending transversely therefrom, said body portion having a longitudinally extending opening exposing the metal sleeve; insulation covering said body section and metal sleeve, except for the ends of said sleeve and the opening to the body section; and a plug of insulating material covering said opening to said body section, and secured to the insulating cover of the body section, said plug being removable to permit electrical contact of a connector with the body section through the opening.

9. The connector of claim 8, wherein the insulating plug is hollow to permit engagement over an end of the metal sleeve to insulate the same.

JULIAN ROGOFF.

REFERENCES CITED

The following references are of record in the file of this patent:

UNITED STATES PATENTS

| Number | Name | Date |
| --- | --- | --- |
| 2,087,384 | Lee | July 20, 1937 |

FOREIGN PATENTS

| Number | Country | Date |
| --- | --- | --- |
| 455,196 | Great Britain | Oct. 15, 1936 |